US011766059B2

(12) United States Patent
Shioya et al.

(10) Patent No.: US 11,766,059 B2
(45) Date of Patent: Sep. 26, 2023

(54) AQUACULTURED CRUSTACEAN AND METHOD OF PRODUCING SAME

(71) Applicant: NIPPON SUISAN KAISHA, LTD., Minato-ku (JP)

(72) Inventors: Itaru Shioya, Oita (JP); Kosuke Matsuoka, Oita (JP)

(73) Assignee: NIPPON SUISAN KAISHA, LTD., Minato-ku (JP)

( * ) Notice: Subject to any disclaimer, the term of this patent is extended or adjusted under 35 U.S.C. 154(b) by 0 days.

(21) Appl. No.: 16/648,514

(22) PCT Filed: Sep. 25, 2018

(86) PCT No.: PCT/JP2018/035468
§ 371 (c)(1),
(2) Date: Mar. 18, 2020

(87) PCT Pub. No.: WO2019/059402
PCT Pub. Date: Mar. 28, 2019

(65) Prior Publication Data
US 2020/0221673 A1 Jul. 16, 2020

(30) Foreign Application Priority Data

Sep. 22, 2017 (JP) ................................. 2017-182531

(51) Int. Cl.
*A23L 17/40* (2016.01)
(52) U.S. Cl.
CPC .......... *A23L 17/40* (2016.08); *A01K 2207/25* (2013.01); *A01K 2207/35* (2013.01); *A01K 2227/70* (2013.01); *A23V 2002/00* (2013.01)
(58) Field of Classification Search
CPC .. A23L 17/40; A01K 2207/25; A01K 2207/35
USPC ........................................................... 800/8
See application file for complete search history.

(56) References Cited

FOREIGN PATENT DOCUMENTS

| CA | 2126632 A1 | 12/1994 |
|---|---|---|
| JP | S61-202663 A | 9/1986 |
| JP | H07-170887 A | 7/1995 |
| JP | 2000-300219 A | 10/2000 |
| JP | 2006-508651 A | 3/2006 |
| JP | 2006-217895 A | 8/2006 |
| JP | 2017-163945 A | 9/2017 |

OTHER PUBLICATIONS

Wong, Teck Muk, "Ultrastructural—Biochemical Changes and Sensory Correlations in Shrimp During Cold Storage." (1982). LSU Historical Dissertations and Theses. 3780. https://digitalcommons.lsu.edu/gradschool_disstheses/3780, Retrieved from: <https://core.ac.uk/download/pdf/217386724.pdf>.*
Koyama (2018, Jour Exp Biol, 221:pp. 1-8).*
International Search Report dated Dec. 4, 2018 in PCT/JP2018/035468 filed on Sep. 25, 2018, 2 pages.
Saito, S., "Recirculating aquaculture system (RAS) (Review) I. System structure and technological components," Sci. Rep. Hokkaido Fish Res. Inst. vol. 86, 2014, p. 81-102.
Takada, K. et al., "Proximate composition, Free Amino acid, Fatty Acid, Mineral and Cholesterol Contents in Imported Frozen Shrimps," Nippon Suisan Gakkaishi, vol. 54, No. 12, 1988, pp. 2173-2179 (with English Abstract).
Okutsu, T. et al., "Free Amino Acids in the Muscle of Whiteleg Shrimp, Litopenaeus vannamei, Reared under a Closed, Recirculating Production System," Journal of Fisheries Technology, vol. 3, No. 1, 2010, pp. 37-41 (with English Abstract).
Matsumoto, M. et al., "Changes in Contents of Glycolytic Metabolites and Free Amino Acids in the Muscle of Kuruma Prawn during Storage," Nippon Suisan Gakkaishi, vol. 56, No. 9, 1990, pp. 1515-1520.
Hargreaves, J. A., "Biofloc Production Systems for Aquaculture," SRAC Publication, No. 4503, Apr. 2013, pp. 1-11, 12 total pages.
Article 30: Statement to File Certificates of Exceptions to Loss of Novelty of Invention submitted in Japanese Patent Application No. 2017-182531, filed on Oct. 16, 2017, 7 pages (with English translation).
Extended European Search Report dated May 26, 2021 in European Patent Application No. 18859209.1, 11 pages.
Dariano Krummenauer et al., "Survival and Growth of *Litopenaeus vannamei* Reared in Bft System Under Different Water Depths", Aquaculture, Elsevier, vol. 465, XP029758418, Sep. 3, 2016, pp. 94-99.
Office Action dated Aug. 9, 2022 in the corresponding Japanese Patent Application No. 2019-543141 (with Machine Translation), 7 pages.
"Standard Tables of Food Composition in Japan of 2015 years (seventh revised)", Ministry of Education, Culture, Sports, Science and Technology, [online], published on Dec. 25, 2015 [search on Jul. 25, 2022], p. 17-18.
Office Action dated May 24, 2022 in corresponding European Patent Application No. 18859209.1, 6 pages.
Komata Y.: "Umami taste of seafoods", Food Reviews International, vol. 6, No. 4, Jan. 1, 1990 (Jan. 1, 1990), pp. 457-487, XP055922577.
Xu Yanshun et al: "Effect of Steam Cooking on Textural Properties and Taste Compounds of Shrimp (iMetapenaeus ensis/ i)", Food Science and Technology Research, vol. 22, No. 1, Jan. 1, 2016 (Jan. 1, 2016), pp. 75-81, XP055922576.

(Continued)

*Primary Examiner* — Valarie E Bertoglio
(74) *Attorney, Agent, or Firm* — Oblon, McClelland, Maier & Neustadt, L.L.P.

(57) ABSTRACT

Provided is an aquacultured crustacean having improved umami, uses thereof, and a method for producing the same. The crustacean does not burrow in sand, contain glycine and alanine, and has 2400 mg or more of free amino acids per 100 g of abdominal muscle. The content of glycine is 550 mg or more per 100 g of abdominal muscle, and the content of alanine is 140 mg or more per 100 g of abdominal muscle.

20 Claims, 1 Drawing Sheet

(56) References Cited

OTHER PUBLICATIONS

Office Action dated Feb. 20, 2023 in corresponding European Patent Application No. 18859209.1, 6 pages.
Mente Eleni et al, "Protein turnover, amino acid profile and amino acid flux in juvenile shrimp *Litopenaeus vannamei*: effects of dietary protein source", The Journal of Experimental Biology, vol. 205, Oct. 15, 2002, pp. 3107-3122, XP093023672.
Shi-Wei et al., "Effect of glycine supplementation on growth performance, body composition and salinity stress of juvenile Pacific white shrimp, Litopenaeus vannamei fed low fishmeal diet", Aquaculture 2014. vol. 418-419. pp. 159-164.
Plinio S. et al., "Effect of calcium, hydroxide, carbonate and sodium bicarbonate on water quality and zootechnical performance of shrimp Litopenaeus vannamei reared in bio-flocs technology (BTF)systems", Aquaculture 2011. vol. 321. No. 1-2. pp. 130-135.
Korean Office Action dated Jul. 18, 2023, issued in corresponding Korean Patent Application No. 10-2020-7011178 (with machine translation), 13 pages.

\* cited by examiner

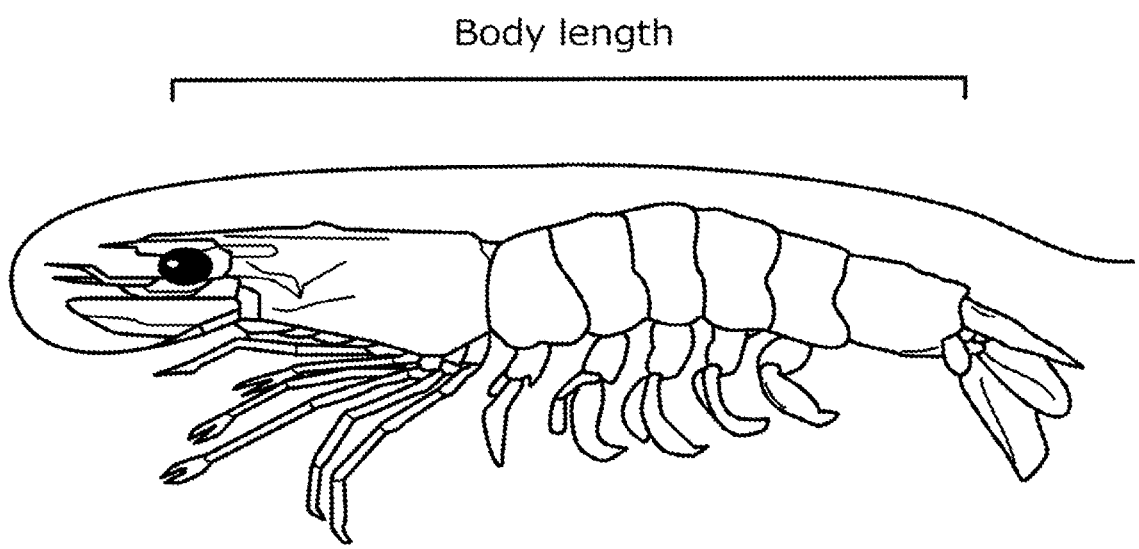

AQUACULTURED CRUSTACEAN AND METHOD OF PRODUCING SAME

TECHNICAL FIELD

The present disclosure relates to an aquacultured crustacean and a method of producing the aquacultured crustacean.

BACKGROUND ART

For aquaculture systems for rearing fishes, shells or crustaceans in an aquaculture tank built on land, equipment and devices have been developed.

For example, among the land aquaculture technologies, biofloc technology has been receiving attention. The aquaculture technology utilizing biofloc technology involves artificially creating a mass of microorganisms called a biofloc to reduce ammonia and nitrous acid, which are otherwise increased by feeding, and utilizing the biofloc itself as a protein source. Examples of the microorganisms utilized in bioflocs include nitrifying bacteria (Sci Rep Hokkaido Fish Res Inst 86, p. 81 to 102 (2014)).

JP 2006-217895 A discloses another example, a method for aquaculturing kuruma prawns (*Marsupenaeus japonicus*), which are highly nocturnal. In this method, a tank is covered with a light-shielding house to control illuminance at the water surface of the tank at not more than 100 lux, beneficial bacteria proliferating regardless of illuminance are preferentially proliferated and maintained in the tank, and kuruma prawns are placed in the tank and cultured.

On the other hand, in aquaculturing such as fishes, shells and crustaceans, deliciousness equivalent to or more than that of the wild-caught animals have been demanded. To meet this demand, various techniques have been proposed.

For example, JP 2000-300219 A discloses a method for treating seafood to impart a good yield without compromising original umami and savor of seafood and an improving agent for taste and yield of seafood. In this method, the seafood is immersed in an aqueous solution containing an edible metal salt of glycine or a mixture of an edible metal salt of glycine and glycine and impregnated with the aqueous solution.

In addition, JP 2006-508651 A discloses aquacultured shrimps, such as an aquacultured shrimp containing a predetermined concentration of docosahexaenoic acid (DHA) and an aquacultured shrimp containing 2,6-dibromophenol or the like as a savor enhancer.

SUMMARY OF THE INVENTION

Technical Problem

In recent years, however, consumer interest in palatability has increasingly grown, and there remains room for improvement to meet much higher demands.

Thus, an object of the present disclosure is to provide an aquacultured crustacean with improved taste, its application, and its production method.

Solution to Problem

The present disclosure is as follows.

(1) An aquacultured crustacean being a non-sand-burrowing crustacean, containing glycine and alanine in the following contents, and having contents of total free amino acids of not less than 2400 mg per 100 g of abdominal muscle:

a glycine content of not less than 550 mg per 100 g of abdominal muscle, and an alanine content of not less than 140 mg per 100 g of abdominal muscle.

(2) The aquacultured crustacean according to (1), further containing at least one amino acid selected from the group consisting of arginine, proline, and glutamic acid in the following contents:

an arginine content of not less than 580 mg per 100 g of abdominal muscle, a proline content of not less than 500 mg per 100 g of abdominal muscle, and a glutamic acid content of not less than 50 mg per 100 g of abdominal muscle.

(3) The aquacultured crustacean according to (1) or (2), wherein a protein content is greater than 21.6 g per 100 g of abdominal muscle.

(4) The aquacultured crustacean according to any one of (1) to (3), wherein a moisture content is less than 75.5 g per 100 g of abdominal muscle.

(5) The aquacultured crustacean according to any one of (1) to (4), wherein a carbohydrate content is less than 0.3 g per 100 g of abdominal muscle.

(6) The aquacultured crustacean according to any one of (1) to (5), wherein an ash content is greater than 1.5 g per 100 g of abdominal muscle.

(7) The aquacultured crustacean according to any one of (1) to (6), wherein a sodium content is greater than 0.152 g per 100 g of abdominal muscle.

(8) The aquacultured crustacean according to any one of (1) to (7), wherein a caloric value is greater than 98 kcal per 100 g of abdominal muscle.

(9) The aquacultured crustacean according to any of one of (1) to (8), wherein the aquacultured crustacean belongs to the order Decapoda.

(10) The aquacultured crustacean according to (9), wherein the aquacultured crustacean belongs to the family Penaeidae.

(11) The aquacultured crustacean according to (10), wherein the aquacultured crustacean belongs to the genus *Litopenaeus*.

(12) An edible part of the aquacultured crustacean according to any one of (1) to (11).

(13) A food containing the edible part of the aquacultured crustacean according to (12).

(14) A composition containing a component derived from the edible part of the aquacultured crustacean according to (12).

(15) A method of producing an aquacultured crustacean including: rearing a non-sand-burrowing crustacean in an aqueous environment using a floc containing nitrifying bacteria for at least 43 days in a shading condition of an illuminance of not more than 100 lux at a central part of a tank, and obtaining the aquacultured crustacean according to any one of (1) to (11) after rearing the aquacultured crustacean under the shading condition.

Advantageous Effects of Invention

The present disclosure can provide an aquacultured crustacean with improved taste, its application, and its production method.

BRIEF DESCRIPTION OF DRAWING

FIG. 1 is a schematic view (lateral view) of an appearance of a prawn.

DESCRIPTION OF EMBODIMENTS

In the present specification, the term "step" includes not only an independent step but also a step that cannot be clearly distinguished from other steps provided that an intended object of the step is achieved. In the present specification, numerical ranges indicated by "to" are ranges including the numerical values described before and after the "to" as the minimum and maximum values, respectively.

In the present specification, the term "not greater than" or "less than" with regard to a percentage includes 0%, that is, "not containing", or means a range including a value undetectable by present means, unless the lower limit value is specifically stated. In the present specification, when a plurality of substances corresponding to each component in a composition is present, the amount of each component in the composition means a total amount of the plurality of substances present in the composition, unless otherwise noted.

In the present specification, amino acids mean free amino acids unless otherwise noted.

An aquacultured crustacean according to the present disclosure is a non-sand-burrowing crustacean containing glycine and alanine in the following contents and having contents of total free amino acids of not less than 2400 mg per 100 g of abdominal muscle:

a glycine content of not less than 550 mg per 100 g of abdominal muscle, and an alanine content of not less than 140 mg per 100 g of abdominal muscle.

A method of producing an aquacultured crustacean according to the present disclosure is a method of producing an aquacultured crustacean including: rearing a non-sand-burrowing crustacean in an aqueous environment using a floc containing nitrifying bacteria for at least 43 days in a shading condition of an illuminance of not greater than 100 lux at a central part of a tank, and obtaining the aquacultured crustacean after rearing the aquacultured crustacean under the shading condition.

The aquacultured crustacean according to the present disclosure has the above constitution and thus has high total free amino acid content and relatively high contents of both two specific free amino acids associated with taste, and this can provide an aquacultured crustacean with improved taste due to the taste resulting from the combination of these amino acids and various applications utilizing such an aquacultured crustacean.

In addition, the method of producing an aquacultured crustacean according to the present disclosure can efficiently provide the aquacultured crustacean according to the present disclosure.

Hereinafter, the present disclosure will be described.
Aquacultured Crustacean

The aquacultured crustacean according to one embodiment of the present disclosure is a non-sand-burrowing crustacean containing glycine and alanine in the following contents, having contents of total free amino acids of not less than 2400 mg per 100 g of abdominal muscle, and optionally containing any other component:

a glycine content of not less than 550 mg per 100 g of abdominal muscle, and an alanine content of not less than 140 mg per 100 g of abdominal muscle.

The aquacultured crustacean according to the present embodiment may be hereinafter, referred to as a "high amino acid crustacean".

In the present specification, an "aquacultured crustacean" means an crustacean that can be aquacultured, and that can be reared over a certain period utilizing freshwater or seawater including artificial seawater in an environment in which conditions, such as feed, sunlight, and temperature, are controlled. Such crustaceans can be broadly classified into a sand-burrowing crustacean with a strong tendency to burrow in sandy soil in a rearing environment to live there and a non-sand-burrowing crustacean without such a tendency.

Examples of the high amino acid crustacean specifically include the superorder Eucarida of the class Malacostraca. The superorder Eucarida include the order Euphausiacea, the order Amphionidacea, and the order Decapoda. The high amino acid crustacean can belong to the order Decapoda. The order Decapoda includes the superfamily Sergestoidea, including a sakura shrimp (*Lucensosergia lucens*) and the like, and the superfamily Penaeoidea. The present high amino acid crustacean can belong to the superfamily Penaeoidea of the order Decapoda.

The high amino acid crustacean can belong to the family Penaeidae of the superfamily Penaeoidea and can be, among organisms of the family Penaeidae, for example, an organism belonging to genera, such as the genus *Farfantepenaeus*, the genus *Fenneropenaeus*, the genus *Litopenaeus, Marsupenaeus*, the genus *Melicertus*, the genus *Metapenaeopsis*, the genus *Metapenaeus*, the genus *Penaeus*, the genus *Trachypenaeus*, the genus *Trachysalambria*, or the genus *Xiphopenaeus*.

The high amino acid crustacean may be, among the family Penaeidae, for example, a species, such as a kuruma prawn (*Marsupenaeus japonicus*), a witch prawn (*Melicertus canaliculatus*), a giant tiger prawn (black tiger) (*Penaeus monodon*), a Chinese white shrimp (*Penaeus chinensis*), a green tiger prawn (*Penaeus semisulcatus*), a western king prawn (*Penaeus latisulcatus*), an Indian white shrimp (*Fenneropenaeus indicus*), an offshore greasyback prawn (*Metapenaeus ensis*), a middle shrimp (*Metapenaeus intermedius*), *Penaeus occidentalis*, a blue shrimp (*Penaeus stylirostris*), a red tail shrimp (*Penaeus pencicillatus*), or a Pacific white shrimp (*Litopenaeus vannamei*) and is not limited to these species.

Organisms of the order Decapoda include nektonic species and non-nektonic species. Nektonic species can use a tank three-dimensionally and thus are suitable for production in overcrowded conditions. Examples of the nektonic species include a kuruma prawn (*Marsupenaeus japonicus*), a Giant tiger prawn (*Penaeus monodon*), a botan shrimp (*Pandalus nipponensis*), a "grape shrimp" ("budouebi" or "higoromoebi") (*Pandalopsis coccinata*), a sakura shrimp (*Lucensosergia lucens*), an Alaskan pink shrimp (*Pandalus eous*), a Chinese white shrimp (*Penaeus chinensis*), an offshore greasyback prawn (*Metapenaeus ensis*), and a Pacific white shrimp (*Litopenaeus vannamei*).

Among others, the non-sand-burrowing high amino acid crustacean can belong to the genus *Litopenaeus* of the family Penaeidae, for example, can be a Pacific white shrimp (*Litopenaeus vannamei*), *Litopenaeus occidentalis, Litopenaeus schmitti, Litopenaeus setiferus*, and a blue shrimp (*Litopenaeus stylirostris*); and can belong to the genus *Farfantepenaeus* of the family Penaeidae, for example, can be a Chinese white shrimp (*Penaeus (Fennero-*

*penaeus*) *chinensis*), an Indian white shrimp (*Fenneropenaeus indicus*), a banana shrimp (*Fenneropenaeus merguiensis*), a red tail shrimp (*Fenneropenaeus penicillatus*), and *Fenneropenaeus*; and particularly can be a Pacific white shrimp (*Litopenaeus vannamei*).

The size of the high amino acid crustacean is not limited, and in classification of foods, the high amino acid crustacean may be any of what is called a lobster, a prawn, and a shrimp.

The high amino acid crustacean contains glycine and alanine in the following contents respectively and has a total free amino acid content of not less than 2400 mg per 100 g of abdominal muscle:

a glycine content of not less than 550 mg per 100 g of abdominal muscle, and an alanine content of not less than 140 mg per 100 g of abdominal muscle.

Glycine and alanine are sweet-tasting free amino acids and known to be closely responsible for deliciousness of shrimps. The aquacultured crustacean having these two specific amino acid species in unprecedented contents can provide a novel taste resulting from the combination of the high content amino acids, and this can achieve improved taste for aquacultured crustaceans known in the art not having both of these specific amino acids in such contents.

In the present specification, the amino acid content means contents of free amino acids per 100 g of abdominal muscle unless otherwise noted.

The contents of free amino acids in the high amino acid crustacean is a value measured according to a ninhydrin method. A high-speed amino acid analyzer L-8900 shape (Hitachi High-Tech Science Corporation) is used in the analysis, and the resulting value is taken as the total free amino acid content. The sample for the analysis is the abdominal muscle, and the methods for preparation and analysis of the sample for the analysis described below in Examples are applied. In the present specification, "abdomen" refers to from the first abdominal segment to the fifth abdominal segment. The amino acid analysis can be applied to a analysis targeted for a high amino acid crustacean obtained after a rearing step in the production method described below. For example, amino acids can be measured by appropriately selecting a timing in post-treatment steps described below, such as before or after sorting, before or after freezing, before or after cleaning, before or after processing, or before or after immersing. In particular, it can be determined that there is no significant difference between the amino acid content of before or after freezing and before or after cleaning.

The total free amino acid content in the high amino acid crustacean is not less than 2400 mg per 100 g of abdominal muscle and can be not less than 2450 mg, not less than 2500 mg, not less than 2550 mg, not less than 2600 mg, not less than 2650 mg, not less than 2700 mg, not less than 2750 mg, not less than 2800 mg, not less than 2850 mg, not less than 2900 mg, not less than 2950 mg, or not less than 3000 mg per 100 g of abdominal muscle. The upper limit value of the total free amino acid content in the high amino acid crustacean is not particularly limited and can be, for example, not more than 5000 mg per 100 g of abdominal muscle. The high amino acid crustacean with a total free amino acid content in this range can strongly exhibit amino acid-based taste. In addition to having such a high total free amino acid concentration, a high level of each of amino acid shown below in combination. Thus, this imparts a complex and good taste due to the combination of the specific amino acids in addition to being able to strongly exhibit amino acid-based taste, and the high amino acid crustacean can exhibit a good taste different from the taste known in the art.

The high amino acid crustacean contains both glycine and alanine in higher content compared to the content known in the art.

The content of glycine in the high amino acid crustacean is not less than 550 mg per 100 g of abdominal muscle and can be not less than 560 mg, not less than 570 mg, not less than 580 mg, not less than 600 mg, not less than 650 mg, not less than 700 mg, not less than 750 mg, not less than 800 mg, not less than 850 mg, or not less than 890 mg per 100 g of abdominal muscle. The upper limit value of glycine in the high amino acid crustacean is not particularly limited and can be, for example, not more than 2000 mg per 100 g of abdominal muscle.

The ratio of glycine relative to the total amino acid content in the high amino acid crustacean can be not less than 22 wt. %, not less than 23 wt. %, not less than 24 wt. %, not less than 25 wt. %, not less than 26 wt. %, not less than 27 wt. %, not less than 28 wt. %, or not less than 29 wt. %.

The content of alanine in the high amino acid crustacean is not less than 140 mg per 100 g of abdominal muscle and can be not less than 145 mg, not less than 150 mg, not less than 155 mg, not less than 160 mg, not less than 165 mg, or not less than 170 mg per 100 g of abdominal muscle. The upper limit value of alanine in the high amino acid crustacean is not particularly limited and can be, for example, not more than 1000 mg per 100 g of abdominal muscle.

The ratio of alanine relative to the total amino acid content in the high amino acid crustacean can be not less than 4.5% by amount, not less than 5 wt. %, or not less than 5.5 wt. %.

In addition to glycine and alanine, the high amino acid crustacean can further contain at least one amino acid selected from other sweet-tasting free amino acids, bitter-tasting free amino acids, and glutamic acid, which is an umami-tasting free amino acid. This can provide a high amino acid crustacean with even more improved taste.

For example, the high amino acid crustacean can further contain at least one amino acid selected from the group consisting of arginine, proline and glutamic acid in the following contents:

an arginine content of not less than 580 mg per 100 g of abdominal muscle, a proline content of not less than 500 mg per 100 g of abdominal muscle, and a glutamic acid content of not less than 50 mg per 100 g of abdominal muscle.

Arginine is known as a bitter-tasting free amino acid, proline is known as a sweet-tasting free amino acid, and glutamic acid is known as an umami-tasting free amino acid. In addition, arginine is also known to be an amino acid exhibiting the savor characteristic of seafood. The high amino acid crustacean which has even more improved taste in addition to the taste due to glycine and alanine can be provided such that the crustacean contains higher amount of an amino acid or an appropriate combination thereof selected from the group of amino acids exhibiting such different tastes than that of the known crustacean, The content of arginine in the high amino acid crustacean is not less than 580 mg per 100 g of abdominal muscle and can be not less than 590 mg, not less than 600 mg, not less than 610 mg, not less than 650 mg, not less than 700 mg, not less than 750 mg, not less than 800 mg, or not less than 850 mg per 100 g of abdominal muscle. The upper limit value of arginine in the high amino acid crustacean is not particularly limited and can be, for example, not greater than 1500 mg per 100 g of abdominal muscle.

The ratio of arginine relative to the total amino acid content in the high amino acid crustacean can be not less than 22 wt. %, not less than 23 wt. %, not less than 24 wt. %, not less than 25 wt. %, not less than 26 wt. %, not less than 27 wt. %, or not less than 28 wt. %.

The content of proline in the high amino acid crustacean is not less than 500 mg per 100 g of abdominal muscle and can be not less than 510 mg, not less than 520 mg, not less than 530 mg, not less than 550 mg, not less than 570 mg, not less than 600 mg, not less than 620 mg, or not less than 640 mg per 100 g of abdominal muscle. The upper limit value of proline in the high amino acid crustacean is not particularly limited and can be, for example, not greater than 1500 mg per 100 g of abdominal muscle.

The ratio of proline relative to the total amino acid content in the high amino acid crustacean can be not less than 19 wt. %, not less than 20 wt. %, or not less than 21 wt. %.

The high amino acid crustacean can further contain glutamic acid. When the high amino acid crustacean contains glutamic acid, the content can be not less than 50 mg, not less than 52 mg, or not less than 54 mg per 100 g of abdominal muscle. The upper limit value of glutamic acid in the high amino acid crustacean is not particularly limited and can be, for example, not greater than 200 mg per 100 g of abdominal muscle.

The ratio of glutamic acid relative to the total amino acid content in the high amino acid crustacean can be not less than 1.5 wt. %, not less than 1.6 wt. %, or not less than 1.7 wt. %.

The combination of amino acids selected from arginine, proline, and glutamic acid may be any of a combination of arginine and proline, a combination of arginine and glutamic acid, a combination of proline and glutamic acid, and a combination of arginine, proline, and glutamic acid. For example, a combination of arginine and proline in addition to glycine and alanine results in a combination of three sweet-tasting free amino acids and one bitter-tasting free amino acid and can provide a taste, for example, having a savor of a shrimp and better balance.

Such a balance of tastes can also be adjusted by the content ratio of these amino acids. Thus, the taste of the high amino acid crustacean can be further improved by a combination of a good content balance of two or more amino acids responsible for sweetness, bitterness, or umami, and a content balance of glycine and alanine.

The contents of glycine and arginine in the high amino acid crustacean can be in a weight ratio from 1:0.5 to 1.5, 1:0.6 to 1.4, 1:0.7 to 1.3, or 1:0.8 to 1.2. The contents of glycine and proline can be in weight ratio of 1:0.4 to 1.6, 1:0.5 to 1.5, 1:0.6 to 1.4, or 1:0.7 to 1.3. The contents of glycine and alanine can be in weight ratio from 1:0.1 to 0.6, 1:0.1 to 0.5, 1:0.1 to 0.4, or 1:0.1 to 0.3. Such a weight ratio of the amino acids may provide an advantage of a better taste balance.

The contents of glycine:arginine:proline:alanine in the high amino acid crustacean can be in a weight ratio from 1:0.5 to 1.5:0.4 to 1.6:0.1 to 0.6. The high amino acid crustacean containing these four amino acids in such ratios can exhibit better taste.

In the high amino acid crustacean, the contents of glutamic acid and glycine can be in a weight ratio from 1:8 to 20, 1:9 to 19, 1:9.5 to 18.5, or 1:10 to 18. The contents of glutamic acid and arginine can be in a weight ratio from 1:6 to 19, 1:7 to 18, 1:7.5 to 17.5, or 1:8 to 17. The contents of glutamic acid and proline can be in a weight ratio from 1:5 to 17, 1:6 to 16, 1:6.5 to 16.5, or 1:7 to 16. The contents of glutamic acid and alanine can be in a weight ratio from 1:1.5 to 6, 1:2 to 5.5, 1:2.5 to 5, or 1:3 to 4.5.

In the high amino acid crustacean, the ratio of the total content of glycine and alanine relative to the total free amino acid content can be not less than 28 wt. %, not less than 30 wt. %, not less than 33 wt. %, not less than 34 wt. %, or not less than 35 wt. % per 100 g of abdominal muscle. The high amino acid crustacean containing the above two specific amino acids in such a range can contain these two amino acids in high ratios and have an improved taste over the taste known in the art. The upper limit value of the ratio of the total content of glycine and alanine relative to the total free amino acid content is not particularly limited and can be, for example, not more than, 90 wt. %, not greater than 88 wt. %, or not greater than 85 wt. %.

In the high amino acid crustacean, the ratio of the total content of glycine, arginine, proline, and alanine relative to the total free amino acid content can be not less than 79 wt. %, not less than 80 wt. %, not less than 81 wt. %, not less than 82 wt. %, not less than 83 wt. %, or not less than 84 wt. % per 100 g of abdominal muscle. The high amino acid crustacean containing the above four specific amino acids in such a range can contain these four amino acids in high ratios and have an improved taste over the taste known in the art. The upper limit value of the ratio of the total content of glycine, arginine, proline, and alanine relative to the total free amino acid content is not particularly limited and can be, for example, not greater than, 95 wt. %, not greater than 93 wt. %, or not greater than 90 wt. %.

In the high amino acid crustacean, a protein content is more than 21.6 g per 100 g. With such a protein content, the high amino acid crustacean is believed to exhibit good taste of food upon the action of a protease. This protein content can be not less than 22.0 g, not less than 22.5 g, or not less than 23.0 g per 100 g of abdominal muscle. The upper limit value of the protein content in the high amino acid crustacean is not particularly limited and can be, for example, not greater than 30 g per 100 g of abdominal muscle.

In the high amino acid crustacean, a moisture content is less than 75.5 g per 100 g of abdominal muscle. With such a moisture content, the body of the high amino acid crustacean is believed not to significantly shrink when subjected to heat. This moisture content can be not greater than 75.0 g or not greater than 74.5 g per 100 g of abdominal muscle. The lower limit value of the moisture content in the high amino acid crustacean is not particularly limited and can be, for example, not less than 60 g per 100 g of abdominal muscle.

In the high amino acid crustacean, a carbohydrate content is less than 0.3 g per 100 g of abdominal muscle. With such a carbohydrate content, the high amino acid crustacean is believed to be suitable for a carbohydrate-restricted diet. This carbohydrate content can be not greater than 0.2 g or not greater than 0.1 g per 100 g of abdominal muscle. The lower limit value of the carbohydrate content in the high amino acid crustacean is not particularly limited and may be, for example, 0 g per 100 g of abdominal muscle.

In the high amino acid crustacean, an ash content is greater than 1.5 g per 100 g. With such an ash content, intake of the high amino acid crustacean is believed to allow increased intake of minerals, and these ashes are also believed to contribute to improving the taste. This ash content can be not less than 1.6 g or not less than 1.7 g per 100 g of abdominal muscle. The upper limit value of the mineral content in the high amino acid crustacean is not particularly limited and can be, for example, not greater than 3.0 g per 100 g of abdominal muscle.

In the high amino acid crustacean, a sodium content is more than 0.152 g per 100 g. With such a sodium content, the high amino acid crustacean is believed to allow reducing a common salt amount required for seasoning shrimps. This sodium content can be not less than 0.200 g or not less than 0.250 g per 100 g of abdominal muscle. The upper limit value of the sodium content in the high amino acid crustacean is not particularly limited and can be, for example, not greater than 1 g per 100 g of abdominal muscle.

In the high amino acid crustacean, a caloric value is more than 98 kcal per 100 g. With such a caloric value, intake of the high amino acid crustacean is believed to allow more efficient calorie intake. This caloric value can be not less than 99 kcal or not less than 100 kcal per 100 g of abdominal muscle. The upper limit value of the caloric value in the high amino acid crustacean is not particularly limited and can be, for example, not greater than 110 kcal per 100 g of abdominal muscle.

Body weight and body length of the high amino acid crustacean vary depending on the type of crustacean.

For example, when the high amino acid crustacean is a Pacific white shrimp, the weight may be, for example, not less than 8 g, not less than 10 g, not less than 12 g, not less than 13 g, not less than 14 g, or not less than 15 g. The upper limit value of the body weight is not particularly limited and can be, for example, not greater than 100 g. When the high amino acid crustacean is Pacific white shrimp, the body length may be not less than 6 cm, not less than 7 cm, not less than 8 cm, not less than 9 cm, not less than 10 cm, not less than 11 cm, or not less than 12 cm. The upper limit value of the body weight is not particularly limited and can be, for example, not greater than 35 cm.

In the present specification, "body weight" means a value obtained by killing high amino acid crustaceans in ice water, then collecting the high amino acid crustacean amounting to about 500 g, and dividing the total weight by the number of individual.

In the present specification, "killing in ice water" means a method of putting a live high amino acid crustacean into a container containing ice in seawater to immediately kill the high amino acid crustacean and maintain its freshness.

In the present specification, "body length" means the length from the cavity in the carapace in the back of the eye, what is called orbit, to the tip of the telson of the high amino acid crustacean. The analysis method may include measuring by extending the body as linearly as possible from the orbit to the tip of the telson or may include measuring by guiding a measuring instrument along the body from the orbit to the tip of the telson. FIG. 1 illustrates parts of the "body length" in an embodiment of the present invention by way of example where the high amino acid crustacean belongs to the order Decapoda.

Method of Producing Aquacultured Crustacean

A method of producing an aquacultured crustacean is not particularly limited as long as the high amino acid crustacean has the amino acid contents described above. The method of producing an aquacultured crustacean described below can efficiently provide the high amino acid crustacean of the present disclosure.

The method of producing an aquacultured crustacean of the present disclosure includes: rearing a non-sand-burrowing crustacean in an aqueous environment using a floc containing nitrifying bacteria for at least 43 days in a shading condition of an illuminance of not more than 100 lux at a central part of a tank (hereinafter, referred to as a "rearing step"), and obtaining the aquacultured crustacean described above (hereinafter, referred to as an "obtaining step") after rearing the aquacultured crustacean under the shading condition. The method includes any other step as necessary.

The production method includes a step of rearing a non-sand-burrowing crustacean in an aqueous environment using a floc containing nitrifying bacteria in a specific shading condition and thus can efficiently provide the high amino acid crustacean described above.

The rearing using a block containing nitrifying bacteria is commonly referred to as aquaculture using a biofloc. In the present invention, the "floc" refers to a mass of microorganisms that is artificially created in water in an aquaculture tank for aquatic organisms, such as fishes, shells or crustaceans, and it may be referred to as a "biofloc" in the present specification. The biofloc can reduce ammonia and nitrous acid, which are toxic otherwise increased by feeding, and the biofloc itself can also be fed as a protein source.

The biofloc contains nitrifying bacteria. Examples of the type of nitrifying bacteria include ammonia-oxidizing bacteria and nitrite-oxidizing bacteria. The "ammonia-oxidizing bacteria" are bacteria that oxidize and convert ammonia nitrogen, for example, an ammonium ion into a nitrite ion, in aquaculture water under an aerobic atmosphere. The "nitrite-oxidizing bacteria" are bacteria that further oxidize and convert the nitrite ion produced by the ammonia-oxidizing bacteria in the aquaculture water into a nitrate ion under an aerobic atmosphere.

Examples of the type of nitrifying bacteria include Nitrobacter, Nitrospina, and Nitrococcus but are not particularly limited, and the nitrifying bacteria can be appropriately selected based on various conditions, such as the type of crustacean to be aquacultured, a hydrogen ion exponent dissolved oxygen, nitrogen concentration, aquaculture density, the size of an aquaculture, that is an amount of aquaculture water, and temperature.

The nitrifying bacteria may be carried on a carrier and used as a nitrifying bacteria-immobilized material in addition to or instead of being present as the biofloc in aquaculture water. The use of the nitrifying bacteria-immobilized material in the aquaculture system has an advantage, such as reducing an excessive increase of the biofloc due to the proliferation of nitrifying bacteria. In using the nitrifying bacteria-immobilized material in addition to the biofloc, the nitrifying bacteria contained in the biofloc and the nitrifying bacteria immobilized on the nitrifying bacteria-immobilized material may be the same or different.

The type of carrier is not particularly limited as long as carrying the nitrifying bacteria is not inhibited and the carrier has no negative effect on the crustacean to be aquacultured, and any of an inorganic carrier made of an inorganic material, such as ceramic, and an organic carrier made of an organic material, such as a resin, can be used. The form of the carrier is not limited as long as carrying the nitrifying bacteria is not inhibited, and examples of the form include a powder, a granule, a mass, and a plate. A porous carrier can carry more nitrifying bacteria and increase contact with the aquaculture water and thus is suitable.

Among inorganic porous carriers, for example, silicate compounds of natural minerals, such as montmorillonite, zeolite, and kaolin, are also suitable for carrying the nitrifying bacteria and thus are expected to improve ability of fixing the nitrifying bacteria. In addition, inorganic carriers other than silicate compounds, such as alumina, can also be used. One of these inorganic porous carriers may be used, or two or more of these inorganic porous carriers may be used in combination.

The particle size of the inorganic carrier is not particularly limited as long as carrying the nitrifying bacteria is not inhibited. On the other hand, excessively small particles may be sieved to remove for such a purpose of achieving uniform quality.

For example, a granular carrier having a particle diameter from approximately 0.1 μm to 250 μm can be used, but the granular carrier is not limited to this.

The organic porous carrier is not limited as long as it has a structure made of a polymer which does not dissolve in water and having high affinity with microorganisms, but a polyurethane foam having excellent wear resistance and a long life is exemplified as a suitable resin material. Examples of the organic porous carrier that can be used specifically include a foamed carrier, a non-woven fabric carrier, a porous gel carrier, and a hollow fiber membrane carrier. One of these organic porous carriers may be used, or two or more of these organic porous carriers may be used in combination.

In particular, the foamed carrier is a structure having open cells and has a large specific surface area and can immobilize the nitrifying bacteria in high concentration per unit volume and thus can be suitably used as a carrier for the nitrifying bacteria-immobilized material. Examples of commercially available products of the foamed carrier include MICROBREATH (registered trademark) (available from AION Co., Ltd.), BIOTUBE (registered trademark) (available from JFE Engineering Corporation), APG (available from Nisshinbo Chemical Inc.), porous cellulose carriers (available from EYELA), Bio-frontier Net (available from KansaiKako Co., Ltd.), and AQUACUBE (available from Sekisui Aqua Systems Co., Ltd.). Any size of the foamed carrier may be used, but when using the foamed carrier in a water permeable container described below, the formed carrier larger than each hole (mesh) of the water permeable container is selected to prevent the outflow of the carrier.

Any method for immobilizing the nitrifying bacteria on the carrier may be used, but, for example, the carrier and a dispersion liquid in which the nitrifying bacteria are dispersed in water is mixed. After mixing, for example, by bringing the mixed dispersion liquid into contact with oxygen, the nitrifying bacteria are immobilized on the carrier while proliferating on the carrier, and the nitrifying bacteria-immobilized material is obtained.

The nitrifying bacteria-immobilized material is disposed in contact with the aquaculture water in the aquaculture tank. For example, the nitrifying bacteria-immobilized material can be placed in a water permeable container. Placing the nitrifying bacteria-immobilized material in a container has advantages, such as facilitating collection and placement of the nitrifying bacteria-immobilized material in the aquaculture water and control of the amount of the nitrifying bacteria-immobilized material (i.e., the amount of the nitrifying bacteria other than the biofloc) according to a condition of the aquaculture water (C/N ratio). In addition, the nitrifying bacteria-immobilized material placed in a water permeable container is not flown out or eliminated and can be stably used.

Examples of the water permeable container specifically include a water permeable basket container. Here, the "basket container" means a container having surfaces each in a net form, porous form, or the like to allow water to pass through the container and having a filling space inside the container, the filling space to which the nitrifying bacteria-immobilized material can be charged. The shape of the basket container is not particularly limited, and the basket container can be, for example, an approximately rectangular parallelepiped housing. The shape and size of the water permeable container is appropriately selected based on the type and size of the nitrifying bacteria-immobilized material, the size of aquaculture equipment, the type and degree of growth of the seafood to be aquacultured, and the like. In addition, the material of the container may be made of metal or plastic and is appropriately selected according to the condition of the aquaculture equipment and the like.

The aquaculture equipment using the biofloc is not particularly limited and can be appropriately selected based on such as the type and size of the non-sand-burrowing crustacean to be aquacultured. The aquaculture method of the present specification includes not only aquaculture in sea, rivers, lakes, and the like but also land aquaculture.

In the present specification, the "aquaculture water" means water or an aqueous solution used for rearing in a tank for aquaculturing the high amino acid crustacean and includes freshwater, seawater, and brackish water. Appropriate aquaculture water can be selected for each crustacean to be reared. Seawater and brackish water may be prepared using artificial seawater. An appropriate change may be made according to a time of rearing from an egg to a shipping size.

The aquaculture equipment may be aquaculture equipment typically used in aquaculturing a non-sand-burrowing crustacean and can be a building including a tank, temperature control equipment to control temperature, plumbing equipment for the aquaculture water into the tank, and as necessary other equipment.

In the rearing step, the above description can be applied to the non-sand-burrowing crustacean to be reared. A growth stage of the crustacean to be reared in the rearing step is not particularly limited and can include stages of a baby shrimp to an adult shrimp, for example, in the case of shrimps. The "baby shrimp" referred in the present specification means a shrimp with a body weight of less than 1 g and does not include a shrimp growing from an egg to a baby shrimp. The "adult shrimp" referred in the present specification means a shrimp that has grown up more than the baby shrimp. The adult shrimp, for example, in the case of Pacific white shrimps, can be typically grown up to not less than approximately 15 g and then shipped.

The water quality of the aquaculture water in the tank can be regularly checked and controlled to be in an appropriate range. The pH of the aquaculture water can be appropriately adjusted according to such as the type of crustacean to be reared and can be, for example, not less than pH 5, not less than pH 6, or not less than pH 7. The upper limit value of the pH can be appropriately adjusted and can be, for example, not greater than pH 10, not greater than pH 9, or not greater than pH 8. When the pH decreases or increases, it can be appropriately adjusted by adding an alkali agent or acid, adjusting a water exchange rate, or the like.

The water temperature can be commonly not lower than 23° C., not lower than 25, or not lower than 27° C., and the upper limit can be not higher than 32° C., not higher than 30° C., or not higher than 29° C. The water temperature can be adjusted by heating with sunlight, a heater, or the like, or by cooling with a cooler, ice, or the like.

Maintaining the water quality in such ranges has advantages, such as reducing stress of the high amino acid crustacean and promoting ingestion.

Feed used in the rearing step can be appropriately selected according to the type of non-sand-burrowing crustacean to be reared. For example, when the non-sand-burrowing crustacean is a Pacific white shrimp, common blended feed for shrimps can be used.

Feed properties, such as buoyancy, sedimentation velocity, and shape retainability in water, can be appropriately changed according to the rearing environment of the non-sand-burrowing crustacean to be reared. Suitable feed can be selected, for example, in accordance with the size and shape of a rearing tank or a rearing pond, a water flow generated in a rearing tank or a rearing pond, and the type of aquaculture water, such as, freshwater, seawater, and brackish water. Furthermore, feed in accordance with fresh water, seawater, or brackish water can be selected.

One example of feed suitable for the high amino acid crustacean is feed containing 50 ppm or more or 100 ppm or more of astaxanthin. The method for containing astaxanthin in the feed may be carried out by dissolving astaxanthin in oil, spraying the mixture to the feed with a spray or adding the mixture to the feed, and then mixing, or a combination of these procedures, or astaxanthin may be added as one of the materials when the feed itself is produced. An amount of feed containing a predetermined concentration of astaxanthin to the shrimp to be aquacultured may be not less than 1%, not less than 2%, not less than 3%, not less than 4%, not less than 5%, not less than 6%, not less than 7%, not less than 8%, not less than 9%, or not less than 10% by weight relative to the body weight, or the feed may be fed to satiation. Feeding may be once, twice, three times, four times, or five times a day. The feeding can be carried out continuously while the remaining feed amount is monitored. The period of giving the feed containing a predetermined concentration of astaxanthin to the shrimp to be aquacultured can be, for example, not less than 7 days, not less than 14 days, not less than 28 days, not less than 35 days, not less than 42 days, not less than 49 days, not less than 56 days, not less than 63 days, not less than 70 days, not less than 77 days, not less than 84 days, or not less than 90 days.

In the rearing step, the non-sand-burrowing crustacean is reared at least 43 days under a specific shading condition. Rearing with this shading condition can provide a high amino acid crustacean with a high content of a specific amino acid.

In the rearing step, rearing is carried out in a shading condition of an illuminance of not more than 100 lux at a central part of a tank. The illuminance is a value measured at a point and by a method described in Examples below. The illuminance is not more than 100 lux and can be not greater than 80, not greater than 70, not greater than 60, or not greater than 50. The lower the illuminance, that is, the darker, the more efficiently the high amino acid crustacean can be obtained. In the present specification, the "central part of a tank" means a part spaced at least not less than 2 m from the end part of the tank, the end part where not less than 150 lux of light can reach, in a tank prepared to rear the high amino acid crustacean.

To achieve such an illuminance condition, the aquaculture equipment can include a lid, a jacket, a cover, or the like that can limit light incident on the tank.

The rearing with the above shading condition is carried out for at least 43 days. This can efficiently provide the high amino acid crustacean containing amino acids in the contents described above. The rearing period varies depending on the type of high amino acid crustacean, but can be, for example, at least 50 days for Pacific white shrimps. The longer the rearing period with this shading condition, the more likely the contents of the predetermined amino acids tend to increase.

The rearing step can include rearing not satisfying the above shading condition, provided that the rearing step includes the above rearing with the above shading condition. The rearing with the shading condition can be carried out before or after the period not satisfying the shading condition and may be carried out, for example, immediately after the start of rearing or immediately before shipping, or in an intermediate period.

The rearing period can be terminated when the high amino acid crustacean according to the present disclosure reaches a desired size, condition, or the like. That is, in the obtaining step following the rearing step, the high amino acid crustacean according to the present disclosure can be obtained. The resulting high amino acid crustacean has high concentrations of the two predetermined amino acids and can exhibit improved taste over the aquacultured crustacean known in the art as described above.

The rearing period varies depending on the type of high amino acid crustacean but is commonly not less than 70 days and can be not less than 80 days or not less than 90 days for Pacific white shrimps. The termination of the rearing period can be appropriately determined according to the type or condition of the high amino acid crustacean to be reared, or the like and can be, for example, within two years.

The high amino acid crustacean obtained in the obtaining step may be applied to various applications in a living state after landing or may be applied to various applications after killing. A method typically used to tighten crustaceans can be used as is to tighten the high amino acid crustacean, and the examples of the technique may include killing in ice water.

The obtaining step can further include one or more of the post-treatment steps, such as sorting the obtained high amino acid crustacean based on the size; cleaning the outer surface of the high amino acid crustacean after rearing or the inside of the intestine of the high amino acid crustacean after rearing; freezing the obtained high amino acid crustacean; processing to process the high amino acid crustacean into a desired form; immersing the high amino acid crustacean in such as a treatment liquid; and packing for shipping (such as packaging).

In the freezing step, freezing conditions applied to freezing crustaceans can be applied as is, and the high amino acid crustacean can be frozen at a temperature condition of, for example, not higher than $-20°$ C. or not higher than $-30°$ C. Examples of the freezing method include air brine, alcohol brine, and saline brine, but the freezing method is not particularly limited, and a freezer typically used can be used.

In the processing step, one or more processing procedures, such as removing the head and shell of the high amino acid crustacean, can be carried out as necessary. Such a series of processing procedures can provide what is called a "shelled shrimp" when the high amino acid crustacean is a shrimp.

The treatment liquid used in the immersing step is not particularly limited, and examples of the treatment liquid may include antioxidants. Examples of the antioxidant include an antioxidant formulation dedicated to shrimps BL-7P (available from Shimakyu Co., Ltd.) 0.5% ice water. The treatment time of the immersion treatment varies depending on the treatment liquid used but can be, for example, approximately 1 minute for an antioxidant formulation.

Applications

As described above, the high amino acid crustacean according to the present disclosure has high total free amino acid content and relatively high contents of both two specific free amino acids and thus has improved taste due to the taste resulting from the combination of these amino acids. Thus, with such improved taste, the high amino acid crustacean is suitable for applications to foods and the like. In applying the high amino acid crustacean to various applications, the whole or a part of the high amino acid crustacean may be used as is or may be subjected to processing, such as extraction and milling, to use it as a processed product.

The whole or a part of the high amino acid crustacean as is or a processed product obtained by further processing the whole or a part of the high amino acid crustacean can be used for various applications as a component derived from the high amino acid crustacean. The high amino acid crustacean-derived component as a formulation component can be combined with any other optional component to constitute a composition containing the high amino acid crustacean component. The formulation ratio of the optional component contained in the composition can be appropriately selected and determined according to the purpose.

The whole or a part of the high amino acid crustacean that can be used for various applications can be an edible part. In the present specification, the edible part of the high amino acid crustacean is a part that can contain an amino acid, and examples of the edible part include a muscle and a tissue surrounding a muscle. Examples of the muscle include muscles in the caudal part, the cephalothorax, and the abdomen, and in particular the muscle may be an abdominal muscle, which has relatively high amino acid content. The edible part of the high amino acid crustacean may have a shell or may have no shell. The composition applied to various applications can be a composition containing a component derived from the edible part of the high amino acid crustacean in combination with any other optional component.

When the production of the high amino acid crustacean can be strictly controlled especially as in land aquaculture, the edible part of the high amino acid crustacean can be commercialized to be eaten raw. Such an application of the edible part of the high amino acid crustacean is not limited, but specific examples of the application include foods, feed, and pharmaceuticals.

The food containing the edible part of the high amino acid crustacean is not particularly limited, and examples of such a food include foods, such as sausages, hams, and processed seafood products. The proportion of the edible part of the high amino acid crustacean in a food containing the edible part of the high amino acid crustacean is not particularly limited. The high amino acid crustacean can be utilized in feed for livestock farming or aquaculture.

In commercializing the high amino acid crustacean as a food or feed, an additive of various types approved for each product, specifically, such as a colorant, a preservative, a thickening stabilizer, an antioxidant bleaching agent, an antibacterial and antifungal agent, an acidulant, a seasoning, an emulsifier, an enhancer, an agent for production, or a fragrance material, may be added.

The high amino acid crustacean and the processed product of the high amino acid crustacean can also be used as a raw material for pharmaceutical products, quasi drugs, and functional foods. "Functional foods" herein mean foods and/or beverages to be ingested for maintaining health in addition to common foods and are a concept including foods for specified health use and foods with nutrient function claims, which are foods with health claims; health foods; nutritional supplements; and nutritional health foods. Among them, foods for specified health use and foods with nutrient function claims, which are foods with health claims, are aspects of preferred functional foods.

In commercializing the high amino acid crustacean and the processed product of the high amino acid crustacean as a pharmaceutical product, a quasi drug, or a functional food, an additive of various types approved for each product, specifically, such as a colorant, a preservative, a thickening stabilizer, an antioxidant bleaching agent, an antibacterial and antifungal agent, an acidulant, a seasoning, an emulsifier, an enhancer, an agent for production, or a fragrance material, may be added.

EXAMPLES

Hereinafter, the present disclosure will be described in detail with reference to examples. However, the present disclosure is not at all limited to these examples. In addition, unless otherwise noted, "ppm" or "%" is on a mass basis.

Example 1

Pacific white shrimps (*Litopenaeus vannamei*) with an average body weight of 1 g were used for rearing.

A tank with a water amount of 300 tons was placed indoors. Sterilized seawater was placed in the tank, and baby shrimps were housed at a density of not less than $100/m^2$. The water temperature was maintained at 26 to 32° C., a carbon source was added to control ammonia concentration, and a pH adjusting agent was added to maintain pH, to promote and control the formation of a biofloc. A porous carrier was used as a nitrifying bacteria-immobilized material. Oxygen was supplied to maintain aerobic environment, excess flocs were collected to maintain an appropriate floc amount, and zero-water exchange aquaculture was carried out for about 3 months. The zero-water exchange aquaculture is an aquaculture method in which water is not exchanged as long as possible. This method can save the cost of exchanging water, and this can reduce the cost of rearing.

The lights from the side and bottom of the tank placed indoors were shielded, and an electric light was controlled to turn on from around 8 a.m. to 5 p.m. Ventilation was carried out with an air stone sunk in the central part of the tank. Feed was given daily. pH was measured once a day in the morning.

The entire top surface of the tank was covered with a light-impermeable synthetic resin plate to control the light coming into the tank. Illuminance was measured using an illuminometer (Digital Illuminometer LX-1108, available from Kenis, Ltd.) at two positions which are about 10 cm above from the water surface on the left and right side of a partition wall, from the entrance toward the interior of the building to 54 m at every 6 m. The results are shown in the Table 1.

TABLE 1

| Location No. | Distance from entrance of building (m) | Illuminance (Lux) | |
|---|---|---|---|
| | | Left | Right |
| 1 | 0 | 152.60 | |
| 2 | 6 | 15.48 | 13.77 |
| 3 | 12 | 20.55 | 14.54 |
| 4 | 18 | 32.47 | 26.39 |
| 5 | 24 | 13.90 | 11.79 |
| 6 | 20 | 25.94 | 14.51 |
| 7 | 36 | 12.62 | 14.30 |
| 8 | 42 | 21.48 | 44.10 |

TABLE 1-continued

| Location | Distance from entrance of building | Illuminance (Lux) | |
|---|---|---|---|
| No. | (m) | Left | Right |
| 9 | 48 | 12.81 | 16.75 |
| 10 | 54 | 80.40 | 20.27 |

For the feed, the composition in Table 2 formulated for a pellet mill with a 3-path conditioner was used. The pellet was produced with a pellet size of 2.4 mm. The feed was continuously given almost all day with an automatic feeder to feed to satiation while a remaining feed amount was being observed.

TABLE 2

| Contents | Wt. % |
|---|---|
| Wheat flour | 37 |
| Soybean cake | 26 |
| Fish meal | 21 |
| Fish oil | 2 |
| Vegetable oil | 2 |
| Other | 12 |

The rearing was started at the above illuminance condition. The rearing was terminated at about 60 days after the start of the rearing. 30 to 35 Pacific white shrimps with a body weight from 28 to 33 g were collected and killed in ice water, and then various amino acid contents in the abdominal muscles were measured as follows.

(1) Preparation of Sample for Analysis

The abdomen was separated from the cephalothorax thoracic of the Pacific white shrimp, caudal appendages were removed, and the abdomen was obtained. The shell of the abdominal shell was stripped, the thin shell of the abdominal appendages was removed, then the resulting abdomen was crushed and homogenized using a Mini-Prop Processor "Cuisinart" (available from Conair Japan G.K.), and a sample for analysis was prepared.

About 2 g of the sample was precisely weighed into a 50 mL conical tube, 8 mL of ion exchanged water was added, and the sample and water were homogenized using a disperser "URTRA TURRAX T-25" (IKA) while adding 10 mL of 5 wt. % trichloroacetic acid aqueous solution.

The sample obtained after the homogenization was centrifuged at a rotation number of 3000 rpm for 15 minutes using a Thermo Fisher Universal Centrifuge "Survall Legend XFR" and a Swing Rotor 75003607, and the supernatant was collected. The collected supernatant was filtered with ADVANTEC NO 2 and then made to a volume of 50 mL with a citric acid buffer (pH 2.2, available from Wako Pure Chemical Industries, Ltd.). Then the solution was filtered using a 0.45 μm membrane filter (Disposable Membrane Filter Unit 25CS045AS, available from ADVANTEC) and a 0.20 μm membrane filter (Disposable Membrane Filter Unit 25CS020AS, available from ADVANTEC), and the resulting solution was used as a sample for analysis.

(2) Amino Acid Analysis

To a high-speed amino acid analyzer L-8900 (available from Hitachi High-Tech Science Corporation), 20 μL of the sample for analysis was applied and measured according to the description of the product operation manual. Content of each amino acid was determined from the ratio of the peak area of each amino acid obtained and the peak area from the standard solution when applied, and then the free amino acid composition contained in the sample was calculated.

For the standard solution, an Amino Acid Mixed Standard Solution AN-11 (available from Wako Pure Chemical Industries, Ltd.), an Amino Acid Mixed Standard Solution B (available from Wako Pure Chemical Industries, Ltd.), and an L-Asparagine Standard Solution (available from Wako Pure Chemical Industries, Ltd.) were used. Precisely 1 mL of each of these solutions was taken to a 25-mL volumetric flask and made to a definite volume with 0.02 N HCl, and the resulting solution was used as the standard solution.

The results are shown in Table 3. In Table 3, "(mg)" for each amino acid of glycine, arginine, proline, alanine, and glutamine indicates the weight (mg) of each of these amino acids per 100 g of abdominal muscle, and "%" indicates the ratio of the weight (mg) of each of these free amino acids relative to the total amount (mg) of the free amino acids per 100 g of abdominal muscle. In Table 3, "total of four" means a ratio of a total of contents (mg) of four amino acids of glycine, arginine, proline, and alanine relative to the total amount (mg) of total free amino acids per 100 g of abdominal muscle. In Table 3, "total free amino acids" means a total (mg) of contents of free amino acids per 100 g of abdominal muscle.

Comparative Example 1

For Comparative Example 1, 30 Pacific white shrimps weighing 10 g to 20 g reared in conditions of not shielding light during rearing were obtained, and contents of various free amino acids and total free amino acid content were measured in the same manner as in Example 1, respectively. The results are shown in Table 3.

TABLE 3

| | Free amino acid content | | | | | | | | | | |
|---|---|---|---|---|---|---|---|---|---|---|---|
| | Glycine | | Arginine | | Proline | | Alanine | | Total of four | Glutamic acid | | Total free amino acid |
| | mg | % | mg | % | mg | % | mg | % | % | mg | % | mg |
| Example 1 | 891 | 29.3 | 860 | 28.3 | 647 | 21.3 | 173 | 5.7 | 84.5 | 52 | 1.7 | 3041 |
| Comparative Example 1 | 264 | 15.1 | 374 | 21.5 | 486 | 27.9 | 144 | 8.3 | 72.7 | 55 | 3.2 | 1743 |

Pacific white shrimps of Example 1 were reared in the rearing step under an illuminance of not more than 100 lux with the water surface covered with a lid and under an illuminance of not more than 40 lux at most points of the tank.

As shown in Table 3, Pacific white shrimps of Example 1 obtained from such rearing contained two amino acids of glycine and alanine, and in addition, arginine, proline, and glutamic acid in relatively high contents. Furthermore, the total free amino acid content was 3041 mg per 100 g, greatly exceeding 2400 mg per 100 g.

In contrast, Pacific white shrimps of Comparative Example 1 had body lengths and body weights approximately equivalent to those of Pacific white shrimps of Example 1 but had the total free amino acid content of 1743 mg per 100 g, far less than 2400 mg per 100 g, and a glycine content of not more than 550 mg, an arginine content of not more than 580 mg, and a proline content of not more than 500 mg. Thus, the balance of the contents of the four amino acids of glycine, arginine, proline, and alanine, as well as the balance of the contents adding glutamic acid were different from those of Example 1.

Taste effects of amino acids are already sufficiently known as described, for example, in "Growth and Aquaculture of Shrimps and Crabs" (p 254 to 256, p 261 to 263, Compiled by Jiro Kittaka, Fumio Takashima, Akio Kanazawa, Koseisha Koseikaku, 1996). All the edible parts of the shrimps of Example 1 having high total amino acid content and balanced with high levels of contents of glycine and alanine, particularly four amino acids of glycine, arginine, proline, and alanine are thus turned out to have excellent taste.

When the abdominal muscles of Example 1 and Comparative Example 1 were actually eaten, the shrimps of Example 1 were more tasteful than those of Comparative Example 1. This confirmed that the taste was improved in the shrimps of Example 1.

(3) General Analyses

The pacific white shrimps of Example 1 and Comparative Example 1 were subjected to general analyses for items shown in Table 4. The analytical results are as shown in Table 4. In addition, as a reference, analytical results of commercially available Pacific white shrimps are also listed.

TABLE 4

| Analysis items | Example 1 | Comparative Example 1 | Commercial shrimp |
| --- | --- | --- | --- |
| Moisture (g/100 g) | 74.1 | 78.4 | 75.5 |
| Protein (g/100 g) | 23.1 | 19.1 | 21.6 |
| Lipid (g/100 g) | 1 | 0.9 | 1.1 |
| Carbohydrate (g/100 g) | 0 | 0.5 | 0.3 |
| Ash (g/100 g) | 1.8 | 1.1 | 1.5 |
| Sodium (g/100 g) | 0.259 | 0.099 | 0.152 |
| Common salt (g/100 g) | 0.7 | 0.3 | 0.4 |
| Caloric value (kcal/100 g) | 101 | 87 | 98 |

As shown in Table 4 above, the Pacific white shrimps of Example 1 resulted in a protein content of 23.1 mg per 100 g, about 20.9% greater than 19.1 mg per 100 g in the Pacific white shrimps of Comparative Example 1 and about 6.9% greater than 21.6 mg per 100 g in the commercially available Pacific white shrimps. Such a greater content of protein than that of Comparative Example 1 and the commercially available shrimps is also believed to contribute to the improved taste.

In addition, as shown in Table 4 above, the Pacific white shrimps of Example 1 resulted in a moisture content of 74.1 mg per 100 g, about 5.5% less than 78.4 mg per 100 g in the Pacific white shrimps of Comparative Example 1 and about 1.9% less than 75.5 mg per 100 g in the commercially available Pacific white shrimps. With such a lower moisture content than that of Comparative Example 1 and the commercially available shrimps, the bodies of the Pacific white shrimps of Example 1 are believed not to significantly shrink when subjected to heat.

In addition, as shown in Table 4 above, the Pacific white shrimps of Example 1 resulted in a carbohydrate content of 0 mg per 100 g, 100% reduction from both 0.5 mg per 100 g in the Pacific white shrimps of Comparative Example 1 and 0.3 mg per 100 g in the commercially available Pacific white shrimps. With such a lower carbohydrate content than that of Comparative Example 1 and the commercially available shrimps, the Pacific white shrimps of Example 1 are believed to be suitable for a carbohydrate-restricted diet.

Furthermore, as shown in Table 4 above, the Pacific white shrimps of Example 1 resulted in a mineral content of 1.8 mg per 100 g, about 63.6% greater than 1.1 mg per 100 g in the Pacific white shrimps of Comparative Example 1 and about 20.0% greater than 1.5 mg per 100 g in the commercially available Pacific white shrimps. With such a greater ash content than that of Comparative Example 1 and the commercially available shrimps, intake of the Pacific white shrimps of Example 1 is believed to allow increased intake of minerals, and these minerals are also believed to contribute to improving the taste.

In addition, as shown in Table 4 above, the Pacific white shrimps of Example 1 resulted in a sodium content of 0.259 mg per 100 g, about 161.6% greater than 0.099 mg per 100 g in the Pacific white shrimps of Comparative Example 1 and about 70.4% greater than 0.152 mg per 100 g in the commercially available Pacific white shrimps. With such a greater sodium content than that of Comparative Example 1 and the commercially available shrimps, the Pacific white shrimps of Example 1 are believed to allow reducing a common salt amount required for seasoning shrimps.

Furthermore, as shown in Table 4 above, the Pacific white shrimps of Example 1 resulted in having caloric value of 101 kcal per 100 g, about 16.1% larger than 87 kcal per 100 g in the Pacific white shrimps of Comparative Example 1 and about 3.1% larger than 98 kcal per 100 g in the commercially available Pacific white shrimps. With such a larger caloric value than that of Comparative Example 1 and the commercially available shrimps, intake of the Pacific white shrimps of Example 1 is believed to allow more efficient caloric intake.

In addition, in the Pacific white shrimps of Example 1, the carbohydrate content decreased, and the protein content increased, as described above, and thus this increase in the amount of heat is inferred to be due to the increase in the protein content. Thus, also in terms of this increase in the amount of heat, the effect of improving the taste in the Pacific white shrimps of Example 1 is inferred.

Thus, the high amino acid crustacean according to the present disclosure is turned out to have improved taste that has not been known in the art.

What is claimed is:

1. A method of producing an aquacultured non-sand-burrowing crustacean, comprising:
rearing a non-sand-burrowing crustacean in an aqueous environment using a floc comprising nitrifying bacteria such that abdominal muscle of the non-sand-burrowing crustacean reaches a total free amino acid content of not less than 2400 mg per 100 g, a glycine content of not less than 550 mg per 100 g, and an alanine content of not less than 140 mg per 100 g; and terminating the rearing of the non-sand-burrowing crustacean in the aqueous environment after the non-sand-burrowing crustacean reaches the total free amino acid content, the glycine content and the alanine content, wherein the rearing of the non-sand-burrowing crustacean in the aqueous environment using the floc includes rearing the non-sand-burrowing crustacean in the aqueous environment using the floc for at least 43 days in a shading condition of an illuminance of not more than 100 lux at a central part of a tank providing the aqueous environment, the non-sand-burrowing crustacean is a Pacific white shrimp, the rearing includes feeding a blended feed formulated and/or selected such that the blended feed is given to the Pacific white shrimp in the aqueous environment, the aqueous environment is seawater, and the blended feed is a blended feed comprising wheat flour, soybean cake, fish meal, fish oil and vegetable oil such that the blended feed has contents of the wheat flour, the soybean cake, the fish meal, the fish oil and the vegetable oil formulated for the non-sand-burrowing crustacean.

2. The method of producing an aquacultured non-sand-burrowing crustacean of claim 1, wherein the rearing comprises rearing the non-sand-burrowing crustacean in the aqueous environment using the floc for at least 50 days in the shading condition of the illuminance of not more than 100 lux at the central part of the tank.

3. The method of producing an aquacultured non-sand-burrowing crustacean of claim 1, wherein the sea water is sterilized seawater.

4. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean reaches at least one of an arginine content of not less than 580 mg per 100 g, a proline content of not less than 500 mg per 100 g, and a glutamic acid content of not less than 50 mg per 100 g.

5. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean has a protein content of greater than 21.6 g per 100 g.

6. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean has a moisture content of less than 75.5 g per 100 g.

7. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean has a carbohydrate content of less than 0.3 g per 100 g.

8. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean has an ash content of greater than 1.5 g per 100 g.

9. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean has a sodium content of greater than 0.152 g per 100 g.

10. The method of producing an aquacultured non-sand-burrowing crustacean of claim 1, wherein the rearing comprises rearing the non-sand-burrowing crustacean in the aqueous environment such that the abdominal muscle of the non-sand-burrowing crustacean has a caloric value is greater than 98 kcal per 100 g.

11. The method of producing an aquacultured non-sand-burrowing crustacean of claim 3, wherein the rearing comprises rearing the non-sand-burrowing crustacean in the aqueous environment using the floc for at least 50 days in the shading condition of the illuminance of not more than 100 lux at the central part of the tank.

12. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean reaches at least one of an arginine content of not less than 580 mg per 100 g, a proline content of not less than 500 mg per 100 g, and a glutamic acid content of not less than 50 mg per 100 g.

13. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean has a protein content of greater than 21.6 g per 100 g.

14. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean has a moisture content of less than 75.5 g per 100 g.

15. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean has a carbohydrate content of less than 0.3 g per 100 g.

16. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean has an ash content of greater than 1.5 g per 100 g.

17. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean has a sodium content of greater than 0.152 g per 100 g.

18. The method of producing an aquacultured non-sand-burrowing crustacean of claim 3, wherein the rearing comprises rearing the non-sand-burrowing crustacean in the aqueous environment such that the abdominal muscle of the non-sand-burrowing crustacean has a caloric value is greater than 98 kcal per 100 g.

19. The method of producing an aquacultured non-sand-burrowing crustacean of claim 4, wherein the rearing comprises rearing the non-sand-burrowing crustacean in the aqueous environment such that the abdominal muscle of the non-sand-burrowing crustacean has a protein content of greater than 21.6 g per 100 g.

20. The method of producing an aquacultured non-sand-burrowing crustacean of claim 4, wherein the rearing comprises rearing the non-sand-burrowing crustacean in the aqueous environment such that the abdominal muscle of the non-sand-burrowing crustacean has a carbohydrate content of less than 0.3 g per 100 g.

\* \* \* \* \*